Oct. 31, 1944.  P. A. NOXON  2,361,790
RATE OF TURN INTEGRATOR
Filed June 21, 1941  2 Sheets-Sheet 1

Fig. 1.

Inventor
Paul A. Noxon.
By Cerstvik & Kalman
Attorneys

Patented Oct. 31, 1944

2,361,790

UNITED STATES PATENT OFFICE 2,361,790

RATE OF TURN INTEGRATOR

Paul A. Noxon, Tenafly, N. J., assignor to Bendix Aviation Corporation, Bendix, N. J., a corporation of Delaware Application June 21, 1941, Serial No. 399,241

25 Claims. (Cl. 33—204)

The present invention relates to indicating instruments, and more particularly to means for accurately indicating, at all times, the magnetic heading of a mobile vehicle such as an aircraft, for example.

Devices heretofore provided for indicating a craft's magnetic heading during or after a turn of the craft have been either the magnetic compass or the rate of turn integrating device or the directional gyro. Magnetic compasses, as is well known, are subject to oscillations, particularly when used on an aircraft and especially during a craft turn, and, hence, are practically useless for indicating the continuous change in magnetic heading during turn. Rate of turn integrating devices, on the other hand, are subject to certain inherent integration errors so that the final indication is either less or more than the actual angle of turn traversed by the craft, while directional gyros are subject to precession or "creeping" off the set course, thereby necessitating frequent re-setting of the gyro.

In view of the foregoing disadvantages surrounding the use of known devices, especially on aircraft, the present invention contemplates the combination of a magnetic compass with a novel rate of turn integrating device of the gyroscopic type in a novel manner, whereby an accurate indication of the craft's magnetic heading is obtained under all conditions.

An object of the present invention, therefore, is to provide a novel apparatus comprising a magnetic compass combined with a novel rate of turn integrating device, wherein the two act simultaneously upon a common indicator and are mutually corrective.

Another object of the invention is to provide novel means for accurately indicating a craft's magnetic heading comprising a novel electrical rate of turn integrator device of the gyroscopic type combined with a magnetic compass in such a manner that during straight normal craft flight the magnetic compass exerts primary control over a remote indicator, while during craft turns the integrator dominates to actuate the remote indicator by an amount substantially equal to the actual amount of craft turn.

Another object of the invention is to provide a novel apparatus having a remote indicator for accurately indicating the craft's magnetic heading, comprising a novel rate of turn integrating device novelly combined with a magnetic compass, wherein after a craft turn has been completed a directive force is exerted upon the indicator by the magnetic compass so as to assure proper orientation of the indicator with the craft's actual magnetic heading.

Another object is to provide a novel system for accurately indicating a craft's magnetic heading comprising a novel electrical rate of turn integrator novelly combined with a magnetic compass for actuating a common indicator or pointer, the latter being arranged at a point remote from the integrator or compass, if desired.

A further object of the present invention is to provide a novel rate of turn integrator of the electrical type having novel means energized in accordance with the rate of craft turn for operating an induction motor which in turn drives the first-named means to a position wherein the latter is energized to drive the induction motor at a speed proportional to the rate of turn.

A still further object is to provide a novel rate of turn integrator of the electrical type comprising an induction motor and an inductive governing device which initially has a voltage induced therein in proportion to the rate of craft turn to operate the induction motor, the latter in turn angularly moving the inductive governing means against a resilient constraint through an elastic coupling to a point wherein the governing device maintains the speed of the induction motor proportional to the rate of craft turn.

An additional object of the present invention is to provide a novel electrical rate of turn integrator with a differential mechanism and an eddy current coupling for integrating a rate of turn function to obtain the amount of turn.

The above and further objects and novel features will more fully appear from the detailed description when the latter is read in connection with the accompanying drawings. It is to be expressly understood, however, that the drawings are for purposes of illustration only and are not intended as a definition of the limits of the invention, reference for the latter purpose being had to the appended claims.

In the drawings, wherein like reference characters refer to like parts in the two figures.

Among other things, the present invention consists in the provision of a novel electric rate of turn integrating device comprising an induction motor and speed governing means therefor including a self-synchronous system having a receiver stator and a rotor in inductive relation therewith and electrically connected with a transmitter stator having a rotor inductively associated therewith, the latter rotor being mounted for angular movement in accordance with the precession of a rate of turn gyroscope so that during a craft turn the transmitter rotor is displaced angularly in response to the precessing gyroscope, thereby setting up a voltage in the receiver rotor as a function of the rate of craft turn, which is amplified and communicated to one phase of the induction motor to operate the latter which, in turn, angularly displaces the receiver rotor through an elastic coupling against a resilient constraint so that the voltage induced in the receiver rotor in this second position is varied, and the second phase of the induction motor is energized in accordance with the latter voltage so as to operate and maintain the speed of the induction motor proportional to the rate of turn. A remote indicator is driven through a reduction gearing from the induction motor to indicate the amount or angle of turn of the craft.

In combination with the foregoing structure, means are provided which are responsive to the direction of the earth's magnetic field for deriving and amplifying a voltage in accordance with the relative angular displacement of the responsive means with respect to the earth's magnetic field for energizing one phase of the induction motor to exert a directive force upon the indicator so that the latter accurately indicates the craft's magnetic heading. The corrective force exerted by the direction responsive means acts to overcome any errors which the indicator may be subject to by reason of inherent errors arising in the integrating device, the combination of the integrating device together with the direction responsive means thus defining a mutually corrective system.

Figure 1:
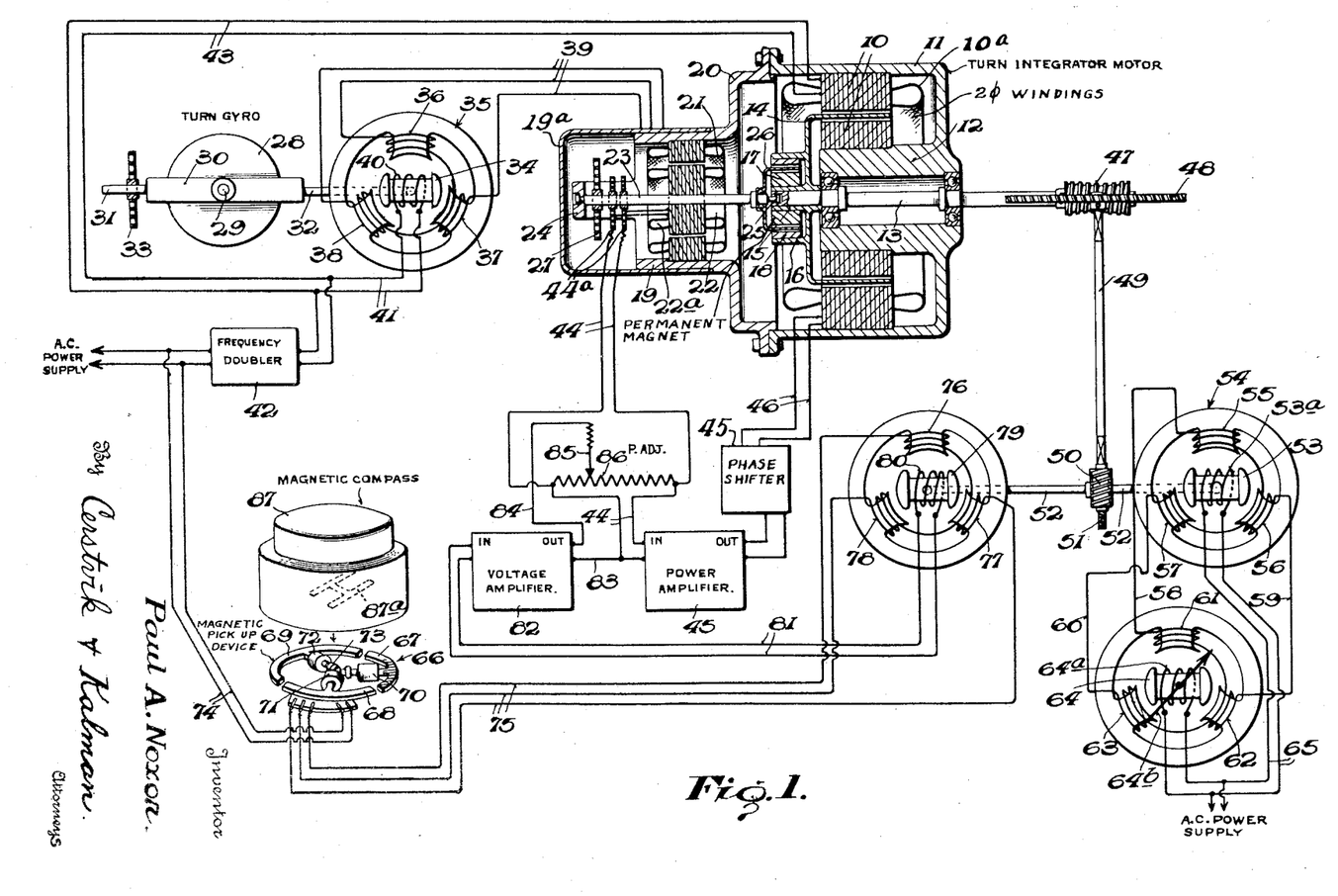
Figure 1 is a diagrammatic representation, partially in section, of one form of the novel apparatus embodying the present invention; and, Figure 2 is a perspective and partially schematic representation of a second form of integrating device to be used with the arrangement of Figure 1.

Referring now to the drawings for a more detailed description of the present invention, and more particularly to Figure 1 thereof, the novel rate of turn integrating device is shown as comprising a two-phase induction motor having stator laminations 10 and two-phase windings 10a mounted in a suitable cup-shaped housing 11 having a central hollow boss portion 12 for supporting a portion of the stator laminations and for accommodating a rotor or driving shaft 13 at the hollow portion thereof which is mounted for rotation upon suitable bearings therein.

The induction motor may be of any suitable and well-known type but, in the present instance, is shown as being of the drag-cup type in that the driving shaft 13 has rigidly mounted thereon at one end thereof for rotation therewith a drag-cup rotor 14 of non-magnetic material having a sleeve portion 15 surrounding the shaft 13 which, together with a cylindrical extension 16, defines a chamber for supporting an annular permanent magnet 17 and an annular ring 18 defining a flux return for the permanent magnet, a suitable air gap being defined between the magnet 17 and flux return 18 for a purpose to presently appear.

A substantially smaller cylindrical housing 19, is secured to the open end of the cup-shaped housing 11 by an extended flange portion 20 thereof and defines a support at the inner periphery thereof for three phase stator windings 21 of a conventional receiver motor which has inductively associated therewith a rotor 22 provided with a single-phase winding 22a mounted for angular movement with respect to stator windings 21 upon a suitable shaft 23, the latter being mounted at one end in a bracket 24 which may be integral with the cylindrical housing 19 and at its other end is provided with a pin 25 which fits into a small recess at an extremity of the driving shaft 13. It is to be understood that the positioning of pin 25 within the recess of shaft 13 in no way acts to transmit directly the angular movement of shaft 13 to shaft 23 but merely acts to maintain shaft 23 in coaxial alignment with shaft 13. A cover plate 19a is provided for closing the open end of the cylindrical housing 19.

Mounted upon the end of shaft 23, which is provided with pin 25, is a metallic drag cup 26 which passes into the air gap formed between permanent magnet 17 and the flux return member 18, thereby defining an eddy current drag coupling between the drag-cup rotor 14 of the induction motor and the shaft 23. At its opposite end, shaft 23 is provided with a suitably calibrated spring 27, one end of which is connected to said shaft and the other end of which is anchored to the bracket member 24 to define a resilient constraint for opposing rotation of shaft 23 for a purpose to likewise presently appear.

The rate of turn function from which the above-described integrator device derives the amount of turn is obtained by way of a rate of turn gyroscope comprising a gyro rotor 28 mounted for spinning about a horizontal axis 29 which in turn is journalled in a gimbal ring 30 having trunnions 31 and 32 mounting the gimbal for angular movement about a second horizontal axis perpendicular to the gyro spin axis. Trunnion 31 is provided with a suitably calibrated spring 33, similar to spring 27, which acts to restrain gyro precession during a turn of the craft upon which the apparatus is mounted so that the angular movement of the gimbal frame 30 is proportional to the rate of craft turn.

Gimbal trunnion 32 is mechanically coupled with a rotor 34 of a conventional transmitter motor comprising a three-phase stator 35 having phase windings 36, 37 and 38 thereon which in turn are electrically connected by way of leads 39 to the three phase receiver stator windings 21.

Rotor 34 is further provided with a single-phase winding 40 thereon which is energized by way of conductors 41 from an alternating current source (not shown) through a frequency doubler 42 whose purpose will be described more fully hereinafter. Due to alternating current flow in rotor winding 40, stator windings 36, 37 and 38, being in inductive relation therewith, have voltages flowing therein which are communicated to receiver stator windings 21 whereby the three voltages are balanced, when the parts are in the "no-turn" position shown in Fig. 1, in their inductive action on the rotor winding 22a and no current flows in the latter. The alternating winding source for energizing rotor winding 40 is also connected by way of leads 43 to energize one phase of the two-phase stator windings 10a of the induction motor 11

Although one phase of the induction motor is always energized, the second phase is de-energized when the craft provided with the above-described apparatus is on a straight normal line of flight and, therefore, the integrating device is inactive at such time. However, as soon as the craft changes its course the gyro rotor 28 precesses and the angular movement of gimbal 30, being opposed by the action of spring 33, is proportional to the rate of craft turn. With movement of gimbal 30, rotor 34 is displaced angularly with respect to its stator, thereby changing the voltages in each of windings 36, 37 and 38. These changed voltages are communicated by way of leads 39 to correspondingly change each of the three voltages of the stator windings 21 of the receiver stator. The angular change in the resultant field created by the changed voltages in each of the receiver stator windings induces a voltage in the winding 22a of the receiver rotor 22, which is transmitted by way of conductors 44 through conventional brushes 44a to the input of a suitable and well-known power amplifier 45, the output of which is fed to the second phase of the two-phase induction motor 11 by way of leads 46, thus energizing both motor phases whereby a rotating magnetic field is generated so that eddy currents are generated in the drag-cup rotor 14 causing the latter to rotate and to carry permanent magnet 17 therewith. As is well known in the art, before a two-phase induction motor will operate, the energizing voltages for each phase must be substantially 90° out of phase with each other and for this purpose suitable means of any well-known type such as, for example, a conventional phase shifter 45a, may be provided at the output of amplifier 45.

The amount of voltage induced in winding 22a of receiver rotor 22 depends upon the amount of angular displacement of gimbal ring 30 and, therefore, upon the amount of angular movement of rotor 34. Initially, the voltage induced in rotor winding 22a is utilized to oppose the starting torque of the induction motor. As soon as the speed of the induction motor increases, sufficient eddy currents are induced in the metallic drag cup 26, thus causing angular movement of shaft 23 and also rotor 22 which is carried by the shaft. The induction motor, but for the action of spring 27, would drive rotor receiver 22 to a positional angular agreement or alignment with the transmitter rotor 34, at which point rotor 22 would reach a position wherein the voltages in stator windings 21 would become balanced in their inductive action on winding 22a and the voltage induced in rotor winding 22a would be of zero value. However, this positional agreement or alignment is prevented by the action of spring 27 which opposes angular movement of shaft 23 so that the rotor 22 is moved angularly to a position just out of alignment with the position of rotor 34, and at this point the voltage induced in the receiver rotor coil 22a is decreased but is of sufficient value, when amplified within power amplifier 45, to maintain the induction motor speed proportional to the rate of craft turn.

It is of importance to note that when the craft goes into its initial turn there is no movement of receiver rotor 22 and it has only a voltage induced in the windings thereof which in value is proportional to the rate of craft turn and which energizes the second phase of the induction motor to bring it to sufficient speed to move shaft 23 and rotor 22 angularly by way of the eddy current coupling 26 against the restraining action of spring 27. As the motor speed continues to increase, rotor 22 is further moved angularly against spring 27 until a point is reached where the rotor is just out of angular agreement with rotor 34 and at this point the voltage induced in winding 22a of rotor 22 is comparatively smaller but, because of its amplification, is sufficient to maintain the induction motor at a speed which is just sufficient to maintain the receiver rotor in the last-named position. Shaft 23, together with its eddy current coupling comprising drag cup 26 and the permanent magnet 17 together with the restraining spring 27 defines a speed governing device whereby the speed of the induction motor is maintained at a value proportional to the rate of the craft turn.

The free extremity of driving shaft 13 of the induction motor is provided with a worm 47 which meshes with a gear 48 carried by a suitably mounted shaft 49 having at its free end a worm 50 thereby defining a reduction gearing system, the worm 50 thereof meshing with a gear 51 which is mounted upon a shaft 52 mechanically coupled with a rotor 53 of a remote indicating self-synchronous transmission system comprising a transmitter stator 54 having windings 55, 56 and 57 which are connected by way of leads 58, 59 and 60 to windings 61, 62 and 63 of a remote indicating receiver stator having a rotor 64 inductively associated therewith. Rotors 64 and 53 are each provided with suitable coils 64a and 53a which connect with each other by way of leads 65, the latter in turn being connected across a source of alternating current.

Movement of shaft 52 due to reduction gearing is therefore proportional to the amount or angle of craft turn, and this movement is communicated to the rotor 53 of transmitter stator 54, which creates a change in induced voltages in transmitter stator windings 55, 56 and 57, the changed voltages being communicated to the respective windings 61, 62, 63 of the receiver stator, so as to provide an angular change in the resultant magnetic field which produces angular movement of receiver rotor 64. Rotor 64 may be provided with a suitable indicator or pointer 64b cooperating with a scale (not shown) in the well-known manner, so as to indicate directly the amount or angle of craft turn.

It will now be apparent to those skilled in the art that the structure hereinabove described is adapted for continuously indicating the amount or angle by which the craft course is being changed and the structure provided for this purpose is of such nature as to derive the amount of turn from the rate of turn. Like all integrating devices, however, errors of integration are accumulated so that the eventual indications of pointer 64b do not correspond accurately to the total change in craft course.

To correct for the foregoing errors of integration, means are now provided whereby the system can be continuously corrected, thereby doing away with the necessity of a periodic resetting which would otherwise be required.

The above-mentioned corrective means may comprise a magnetic pick-up device 66 having three legs 67, 68 and 69 which join at a common central point and each of which is provided with coils 70, 71 and 72. The junction point of legs 67, 68 and 69 is provided with an energizing winding 73 which communicates by way of suitable leads 74 with the alternating current source from which the one phase of the induction motor is energized. The pick-up device 66 may be of the type shown and disclosed in the co-pending application Serial No. 336,444, filed May 21, 1941, of Alfred A. Stuart, Jr., which is assigned to the assignee of the present application.

As fully described in the above-mentioned application, the earth's magnetic field threads legs 67, 68 and 69, the density of the flux threading each leg being dependent upon the angular disposition of each leg with respect to the earth's magnetic field. The energizing winding 73, in being supplied with an alternating current voltage from the source by way of leads 74, alternately saturates and desaturates each of the three legs of the pick-up device so that the earth's field is driven from out of the legs, thus inducing an impulse in each of the windings 70, 71 and 72. Since at each half-cycle, two impulses are induced through the windings, one impulse being produced at the point of saturation and the other at the point where desaturation sets in, the frequency of the final output of each of the windings 70, 71 and 72 will be twice the frequency of the energizing voltage provided from the alternating current source. Since this output voltage is utilized, in a manner to be presently described, to energize the second phase of the induction motor, the frequency of the voltage energizing the first phase of the induction motor must be the same as the frequency of the voltage energizing the second phase, and for that reason frequency doubler 42 is provided between the alternating current source and leads 43 feeding the first phase of the induction motor.

Since the voltages induced in windings 70, 71 and 72 of the pick-up device are of a relatively small value, it is desirable that they be amplified and, therefore, they are communicated by way of conductors 75 to stator windings 76, 77 and 78 of a compass inductive device having a rotor 79 inductively associated with the stator windings, the rotor being provided with a coil 80 connected by way of leads 81 to the input of a suitable and well-known voltage amplifier 82.

In the present instance, as illustrated in Fig. 1, the pick-up device 66 is arranged adjacent a magnetic compass 87 having well-known compass magnets 87a which, by virtue of the action of the earth's magnetic field, line up with or are parallel to the lines of force of the earth's field and, at the same time, define a permeable path for concentrating the lines of force of the earth's field. Both the magnetic compass 87 and the pick-up device 66 are stationary with respect to the craft and, therefore, during a deviation of the craft from a set course relative movement ensues between the compass magnets of the magnetic compass 87 and the pick-up device 66. This angular displacement varies the density of the flux traversing each of the legs 67, 68 and 69 of the pick-up device, and, therefore, varies the amount of voltage induced in each of windings 70, 71 and 72, this change being communicated to windings 76, 77 and 78 of the stator windings of the compass inductive device whereby the angular change of the resultant magnetic field of the stator windings due to the changed voltages therein induces a voltage in coil 80 of the rotor 79 which voltage, in turn, is communicated to the voltage amplifier 82 by way of leads 81.

The output of voltage amplifier 82 communicates with the input of power amplifier 45 by way of leads 83 and 84, the latter being connected with an adjustable sliding element 85 cooperating with a resistor element 86 and leads 44. This arrangement of the adjustable element 85 together with the resistor 86 may be termed a proportionality adjustment, the purpose of which is to initially set the complete apparatus in such a manner that the output voltage of the voltage amplifier 82 resulting from the pick-up device will be substantially below the value of the voltage communicated to the power amplifier 45 by way of leads 44 as a result of gyro precession during craft turn.

The output of the voltage amplifier 82 is thus communicated to the power amplifier 45 and then transmitted to energize the second phase of the induction motor and cause the latter to operate, whereby driving shaft 13, through the reduction gearing, rotates gear 51 which drives a continuation of shaft 52.

Shaft 52, being mechanically coupled with rotor 53 at one of its ends, is mechanically coupled at its other end with rotor 79 of the compass inductive device which is angularly displaced by the shaft to a position wherein the rotor attains its null, which is the position at which the electrical axis of coil 80 is perpendicular to the resultant magnetic field of stator windings 76, 77 and 78, so that no voltage is induced in rotor coil 80 thereby de-energizing the induction motor. At the same time that shaft 52 is driven by the reduction gearing, the remote indicator 64b is likewise displaced an angular amount corresponding to the angular amount of displacement of rotor 79 of the compass inductive device so as to be in angular agreement with the angle of displacement of the pick-up device 66 with the earth's magnetic field.

During straight normal craft flight, as described above, the integrator device is de-energized and, therefore, the compass system has primary control over the angular motion of indicator 64b. Any minor deviation of the craft from a predetermined course, which is insufficient to cause precession of the gyro rotor 28, is communicated to indicator 64b from the compass system. This is accomplished by the reason of the changed voltages in windings 70, 71 and 72 of the pick-up device resulting from the minor angular displacement of the pick-up device 66 relative to the magnets of the compass 87 which change is communicated to stator windings 76, 77 and 78 of the compass inductive device to induce a voltage in rotor coil 80 which voltage in turn is amplified by way of voltage amplifier 82 and power amplifier 45 to energize the second phase of the induction motor to thereby drive shaft 52 through the reduction gearing to angularly displace rotor 79 of the compass inductive device to its null position and at the same time to angularly displace indicator 64b. As the induction motor is operated due to the voltage output of the pick-up device resulting from the minor change in the craft's course, it is to be noted that the receiver rotor 22 will be moved a minor angular amount from its null position so as to have a voltage induced therein.

Even though the turn gyro is showing no turn, still the transmitter rotor coil 40, in being constantly energized from the source, produces at all times a minor voltage in transmitter stator windings 36, 37, 38 which provide a like flow in the stator windings of the receiver 21. The voltage component created by the slight angular movement of receiver rotor 22 is sufficient to tend to oppose the action of the pick-up device signal upon the second phase of the induction motor and consequently to oppose or damper the speed of operation of the induction motor so as to, in turn, dampen the angular movement of indicator 64b. The turn integrator, therefore, even though it is not energized due to gyro precession, serves to limit the speed at which correction is applied by the compass upon indicator 64b. This is an important consideration for the reason that during a relatively slow turn to which the gyroscope is insensitive, the magnets of the compass may be subjected to oscillations which therefore are dampened before they can act upon indicator 64b. Furthermore, this arrangement is of such nature that during minor turns the signal or impulse from the compass will at all times be small so that during turns when the compass is unduly disturbed it will have but little effect on the accuracy of the indication and any unsteadiness which might be caused by the compass on straight flight or even during a slow change in craft course will be eliminated by the governing action of the turn integrator above described.

Considering now the operation of the above-described arrangement, it will be understood that during a rapid rate of turn of the craft the magnetic compass 87 is subjected to large oscillations, therefore making its indication practically useless for indicating the angle of craft turn and, hence, even though the pick-up device 66 is energized in accordance with the oscillating magnets of compass 87, the output thereof, as determined by the voltage induced in rotor coil 80 of the compass inductive device, is by the initial adjustment of sliding element 85 so small that the integrating device assumes primary control over indicator 64b.

As above described, gyro rotor 28 will precess in accordance with the rate of turn, and the angular movement of the gimbal ring 30 is opposed by the action of calibrated spring 33 to such an amount that the angular movement of the gimbal is proportional to the rate of turn. Rotor 34 of the transmitter motor is displaced an angular amount equal to the angular amount of movement of gimbal 30, thereby varying the induced voltages in transmitter stator windings 36, 37, 38 which, in being communicated to the receiver stator windings 21 cause an angular change in the resultant magnetic field to thereby induce a voltage in receiver rotor 22 which is communicated by way of leads 44 to the input of the power amplifier 45 and out therefrom by way of leads 46 to the second phase of the induction motor, the first phase being continuously energized from the alternating current source by way of leads 43 through the frequency doubler 42. The initial voltage for operating the induction motor is such that it must oppose the starting torque in rotating the induction motor drag cup 14 and to bring it to speed wherein the rotating permanent magnet creates sufficient induced eddy currents in the metallic drag cup 26 to angularly displace the shaft 23 and receiver rotor 22 therewith against the resilient constraint of spring 27 to a position closely in alignment or angular agreement with the displaced transmitter rotor 34.

The induced voltage in rotor 22 at this point is decreased but is of sufficient amount, after being amplified through power amplifier 45, to maintain the speed of the induction motor constant whereby the latter runs at a speed proportional to the rate of craft turn and through the reduction gearing 47, 48, 50 and 51 angularly displaces the indicating transmitter rotor 53 which causes a change in the induced voltages in the indicating transmitter stator windings 55, 56 and 57 which, in turn, are communicated to the receiver stator windings 61, 62 and 63 to create a variation in the resultant magnetic field acting on the receiver rotor 64 to angularly displace the latter to a null position, carrying indicator 64b therewith.

As soon as the craft turn is terminated, the gyro rotor 28 is returned to its zero position by spring 33, thereby immediately decelerating and de-energizing the induction motor, but due to the accumulated integration errors in the integrating or speed governing device, the angular position of indicator 64b will be slightly out of agreement with the actual magnetic heading of the craft. The immediate deceleration and de-energization of the induction motor occurs because of the braking effect provided by the reversed voltages induced in receiver rotor winding 22a as a result of the return of the transmitter rotor 24 to its "no turn" position by the rate of turn gyro.

At the point where the craft turn has terminated and very shortly thereafter, the compass magnets of compass 87 will stop oscillating and will be in alignment with the earth's magnetic field. Due to the angular displacement of the pick-up device with respect to the compass magnets, the voltages induced in windings 70, 71 and 72 of the pick-up device 66 will be varied, and this variation will be communicated to stator windings 76, 77 and 78 of the compass inductive device thereby generating a voltage in rotor coil 80 which, in turn, is amplified in voltage amplifier 82 and power amplifier 45 to energize the second phase of the induction motor.

The induction motor now operates to drive rotor receiver 79 of the compass induction device back to its null position at which point the induction motor is again de-energized and during which time the indicating transmitter rotor 53 has been angularly displaced thereby creating varying voltages in stator windings 55, 56 and 57 which are communicated to the receiver stator windings 61, 62 and 63 creating an angular movement on the part of rotor 64 to its null position which position will now correspond to the position of the compass magnets and, hence, indicator 64b associated with the rotor 64 will give an accurate indication of the craft's magnetic heading.

It is also to be noted that during a craft turn, to which the gyro rotor responds, the angular displacement between the pick-up device 66 and the compass magnets of compass 87 will provide a small voltage component which, depending upon the direction of oscillation of the compass magnets, will either add or subtract with the voltage component induced in the receiver rotor 22 due to the gyro precession to produce a resultant speed of the induction motor slightly faster or slower than that called for by the turn integrator alone. In this manner, it will be noted, that the combination of the turn integrator device, together with the magnetic compass, defines a novel arrangement wherein the devices are mutually corrective and act together either jointly or individually upon an indicator so that the latter may accurately indicate at all times the craft's magnetic heading.

Figure 2:
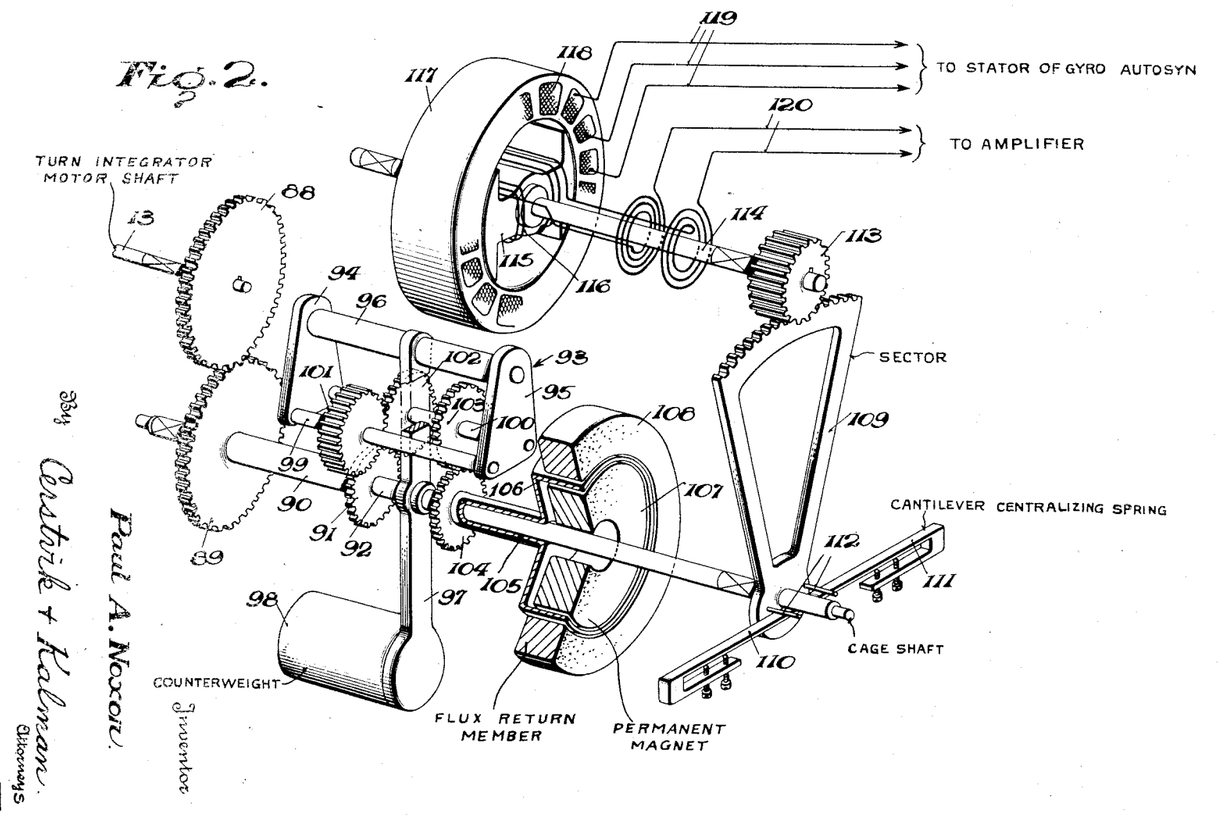

It has been found that with the use of the integrating device illustrated in Figure 1 and described in detail hereinabove, some lag results between the period of gyro precession and that in which the induction motor obtains constant speed proportional to the rate of turn after overcoming the starting torque. In order to overcome this lag or "hunting," as it may be termed, the arrangement of Figure 2 is provided. In the latter figure, the induction motor driving shaft 13 of Figure 1 is shown as provided with a gear 88 which meshes with a gear 89 which, in turn, is mounted upon a suitable hollow driven shaft 90 carrying at its opposite end a smaller gear 91.

Hollow shaft 90 is sleeved about a cage shaft 92 which is provided with a rocking cage 93 thereon comprising two end plates 94 and 95 connected together by way of a rod 96 which carries an arm 97 at its central portion, the arm being provided at its lower extremity with a counterweight 98 to maintain the cage 93 in a substantially vertical position.

End plates 94 and 95 have further journalled for rotation therein shafts 99 and 100, the former being provided with a gear 101 arranged for meshing with gear 91 while shaft 100 is provided with gears 102 and 103, the former meshing with gear 101 and the latter meshing with another gear 104 which is mounted upon a hollow driving shaft 105 sleeved about cage shaft 92 and carrying at its extremity a metallic drag cup 106 which cooperates with the air gap formed between a stationary permanent magnet 107 sleeved about cage shaft 92 and an annular flux return member 108. The free end of shaft 92 has rigidly secured thereto a gear sector 109. Angular motion on the part of cage shaft 92 is constrained by the action of two cantilever centralizing springs 110 and 111 which cooperate with pins 112 carried by the gear sector. Gear sector 109 meshes with a gear 113 suitably mounted upon a rotor shaft 114 which in all respects is similar to the rotor shaft 23 of the integrating device shown in Figure 1.

Shaft 114 has mounted for rotation therewith a rotor 115 carrying a coil 116 thereon, the rotor and its coil being inductively associated with a receiver stator 117 having three-phase stator windings 118 which connect by way of leads 119 to the stator windings 36, 37 and 38 of the transmitter stator 35, shown in Figure 1. Stator 117, together with its windings 118 and rotor 115 with its coil 116, is similar in all respects to the receiver stator 21 and its windings and the receiver rotor 22 and its windings illustrated in Figure 1.

In operation, the windings 118 of the receiver stator have variable voltages induced therein in accordance with the angular displacement of transmitter rotor 34 of Figure 1 responding to the gyro precession and these voltages generate an induced voltage in coil 116 of the receiver rotor 115 which is communicated by way of leads 120 to the power amplifier 45 for energizing the second phase of the induction motor as shown in Figure 1. Upon such energization the induction motor driving shaft 13 through gears 88, 89 and 91 drives gear 101, 102, 103 and 104 which urges relative rotation of the metallic drag cup 106 with respect to the stationary permanent magnet 107.

During its initial operation the torque resisting rotation of drag cup 106 is of such a value as to prevent rotation on the part of gear 104 whereby gears 103 and 101 are caused to "walk" around gears 91 and 104 thus producing an angular movement on the part of arm 97 and rocking cage 93 to angularly displace cage shaft 92 whose motion, in turn, is constrained by the action of springs 110 and 111. Cage shaft 92 drives gear sector 109 and gear 113 to move the receiver rotor 115 to a position wherein the voltage generated and induced in its coil 116 is just sufficient to maintain the speed of the induction motor proportional to the rate of craft turn. In other respects the structure of Figure 2, operates in the same manner as that shown in connection with Figure 1 and the take-off to the indicating means may be from the driving shaft 13 through a reduction gearing as shown in Figure 1.

The lag arising before the induction motor speed attains a value proportional to the rate of turn is obviated with the use of the structure described in connection with the structure of Figure 2 for the reason that the torque required to overcome the inertia of the drag cup 106 during acceleration of the induction motor will also be applied to the rocking cage 93 and thus the shaft 92, this torque being in such a direction that during motor acceleration the inertia torque will add to the drag torque already existing to thereby produce momentarily a greater torque on shaft 92 than would be present or exerted on shaft 92 at a constant speed.

It will now be apparent to those skilled in the art that a novel apparatus has now been provided which due to the combination of a novel electrical integrating device together with a magnetic compass, will at all times accurately indicate the craft's magnetic heading whether it be turning or flying in a straight normal path. Furthermore, it will be apparent that, in accomplishing the purpose stated, a novel electrical turn integrator device has been provided comprising an induction motor and a speed governing means therefor which is adapted for initial energization in accordance with the rate of craft turn to accelerate the motor, the latter, in turn, operating the speed governing means so that the energization thereof is varied to maintain the motor speed substantially proportional to the rate of craft turn. The speed governing device may be of such nature as to utilize a differential mechanism whereby the starting torque for operating the induction motor is added to the torque exerted upon an eddy current drag cup so that the two torques combine to rapidly adjust the energization of the speed governing means to a point wherein the motor is operated at a speed proportional to the rate of craft turn.

Although but two embodiments of the invention have been illustrated and described in detail, it is to be expressly understood that the invention is not limited thereto. Various changes may be made in the design and arrangement of the parts without departing from the spirit and scope of the invention, as will now be apparent to those skilled in the art. For a definition of the limits of the invention, reference is to be had primarily to the appended claims.

What is claimed is:

1. In combination with means for indicating the magnetic heading of a craft, an induction motor drivably associated with said indicating means, gyroscopic means mounted for precession in accordance with the rate of turn of the craft, induction means angularly movable in response to precession of said gyroscopic means, inductive means connected to said induction means and angularly movable with said motor, an electrical connection between said inductive means and said induction motor, and an elastic coupling interconnecting said inductive means and said motor, said inductive means initially having a voltage induced therein in accordance with the precession of the gyroscopic means and the angular movement of said induction means during a craft turn for energizing said induction motor whereby said inductive means is driven angularly through said coupling to substantially an angular positional agreement with said induction means, the voltage induced in said inductive means in the latter position thereof being sufficient to maintain the speed of said motor substantially proportional to the rate of craft turn.

2. In combination with means for indicating the magnetic heading of a craft, an induction motor drivably associated with said indicating means, gyroscopic means mounted for precession in accordance with the rate of turn of the craft, induction means angularly movable in response to precession of said gyroscopic means, resiliently constrained inductive means connected to said induction means and angularly movable with said motor, an electrical connection between said inductive means and said induction motor, and an elastic coupling interconnecting said inductive means and said motor, said inductive means initially having a voltage induced therein in accordance with the precession of the gyroscopic means and the angular movement of said induction means during a craft turn for energizing said induction motor whereby said inductive means are driven angularly through said coupling against the action of said resilient constraint to substantially an angular positional agreement with said induction means, the voltage induced in said inductive means in the latter position thereof being sufficient to maintain the speed of said motor substantially proportional to the rate of craft turn.

3. In combination with means for indicating the magnetic heading of a craft, an induction motor drivably associated with said indicating means, gyroscopic means mounted for precession in accordance with the rate of turn of the craft, resiliently constrained inductive means angularly movable by said motor, an eddy current coupling interconnecting said inductive means and said motor, induction means angularly movable in response to precession of said gyroscopic means and electrically connected with said inductive means, an electrical connection between said inductive means and said induction motor, said inductive means initially having a voltage induced therein in accordance with the precession of the gyroscopic means and the angular movement of said inductive means during a craft turn for energizing said induction motor whereby said inductive means are driven angularly through said coupling against the action of said resilient constraint to substantially an angular positional agreement with said induction means, the voltage induced in said inductive means in the latter position thereof being sufficient to maintain the speed of said motor substantially proportional to the rate of craft turn.

4. In combination with means for indicating the magnetic heading of a craft, an induction motor for driving said indicating means, gyroscopic means mounted for precession in accordance with the rate of turn of the craft, resiliently constrained inductive means angularly movable with said motor, an elastic coupling interconnecting said inductive means and said motor, induction means angularly movable in response to precession of said gyroscopic means and electrically connected with said inductive means, an electrical connection between said inductive means and said induction motor, said inductive means initially having a voltage induced therein in accordance with the precession of the gyroscopic means and the angular movement of said induction means during a craft turn for energizing said induction motor whereby said inductive means are driven angularly through said coupling against the action of said resilient constraint to substantially an angular positional agreement with said induction means, the voltage induced in said inductive means in the latter position thereof being sufficient to maintain the speed of said motor substantially proportional to the rate of craft turn to drive said indicating means an amount proportional to the angle of craft turn, and means responsive to the direction of the earth's magnetic field for energizing said induction motor when the craft turn has terminated whereby said indicating means is driven to a positional agreement with said last-named responsive means.

5. In combination with means for indicating the magnetic heading of a craft, an induction motor for driving said indicating means, gyroscopic means mounted for precession in accordance with the rate of turn of the craft, resiliently constrained inductive means angularly movable with said motor, a yielding coupling interconnecting said inductive means and said motor, induction means angularly movable in response to precession of said gyroscopic means and electrically connected with said inductive means, an electrical connection between said inductive means and said induction motor, said inductive means initially having a voltage induced therein in accordance with the precession of the gyroscopic means and the angular movement of said induction means during a craft turn for energizing said induction motor whereby said inductive means are driven angularly through said coupling against the action of said resilient constraint to substantially an angular positional agreement with said induction means, the voltage induced in said inductive means in the latter position thereof being sufficient to energize and maintain the speed of said motor substantially proportional to the rate of craft turn, and means responsive to the direction of the earth's magnetic field for energizing said induction motor when the craft turn has terminated whereby said indicating means is driven to a positional agreement with said last-named responsive means, said inductive means being moved an angular amount through said coupling thereby having a voltage induced therein to dampen the control of said responsive means upon said indicating means.

6. Apparatus for use on mobile craft for indicating the magnetic heading of the craft, comprising an indicator, gyroscopic means mounted for precession in accordance with the rate of turn of the craft, an induction motor, a transmitter stator and a rotor inductively associated with said stator, a receiver stator and a rotor inductively associated with said last-named stator, said stators being electrically interconnected, said transmitter rotor being mounted for angular movement by and in accordance with the precessional movement of said gyroscopic means during craft turn whereby a voltage is induced in said receiver rotor in accordance with said precession for energizing said induction motor, an electrical circuit connecting said motor with said receiver rotor, a yieldable coupling interconnecting said induction motor and said receiver rotor whereby said receiver rotor is urged angularly to a position wherein the voltage induced in said receiver rotor is sufficient to maintain said induction motor at a speed proportional to the rate of craft turn, and means whereby said indicator is driven at a speed proportional to said motor speed to indicate substantially the angle of craft turn.

7. Apparatus for use on mobile craft for indicating the magnetic heading of the craft comprising an indicator, gyroscopic means mounted for precession in accordance with the rate of turn of the craft, an induction motor, a transmitter stator and a rotor inductively associated with said stator, a receiver stator and a rotor inductively associated with said last-named stator, said stators being electrically interconnected, an electrical connection between said receiver rotor and said induction motor, said transmitter rotor being angularly moved by and in accordance with the precessional movement of said gyroscopic means during craft turn whereby a voltage is induced in said receiver rotor as a function of said precession for energizing said induction motor, an eddy current drag coupling interconnecting said induction motor and said receiver rotor whereby said receiver rotor is urged angularly to a position wherein the voltage induced in said receiver rotor is sufficient to maintain said induction motor at a speed proportional to the rate of craft turn, and means driven by said motor to move said indicator to indicate substantially the angle of craft turn.

8. Apparatus for indicating the magnetic heading of a craft comprising an indicator, gyroscopic means mounted for precession in accordance with the rate of turn of the craft, an induction motor, a transmitter stator and a rotor inductively associated with said stator, a receiver stator and a rotor inductively associated with said last-named stator, said stators being electrically interconnected, an electrical connection between said receiver rotor and said induction motor, said transmitter rotor being angularly moved by and in accordance with the precessional movement of said gyroscopic means during craft turn whereby a voltage is induced in said receiver rotor as a function of said precession for energizing said induction motor, means resiliently constraining angular movement of said receiver rotor, an eddy current drag coupling interconnecting said induction motor and said receiver rotor whereby said receiver rotor is urged angularly against the action of said constraining means to a position wherein the voltage induced in said receiver rotor is sufficient to maintain said induction motor at a speed proportional to the rate of craft turn, means driven by said motor to move said indicator to indicate substantially the angle of craft turn, and means responsive to the direction of the earth's magnetic field for assuming primary energization of said induction motor when the craft turn has terminated whereby said indicator is driven to a positional agreement with said last-named responsive means.

9. An integrating device for an aircraft comprising an induction motor, inductive means arranged for angular movement by said motor, means comprising a rate of turn gyro mounted for precession in accordance with the rate of craft turn and connected electrically with said inductive means to induce voltages therein as a function of the rate of craft turn, an electrical connection between said inductive means and said motor for energizing and operating said motor, and means comprising a yieldable coupling interconnecting said motor and said inductive means whereby the latter is moved angularly to a position wherein the voltage induced in said inductive means is varied to operate said motor at a speed proportional to the rate of craft turn.

10. An integrating device for an aircraft comprising an induction motor, inductive means arranged for angular movement by said motor, means comprising a rate of turn gyro mounted for precession in accordance with the rate of craft turn and connected electrically with said inductive means to induce voltages therein as a function of the rate of craft turn, an electrical connection between said inductive means and said motor for energizing and operating said motor, and means comprising an eddy current drag coupling between said motor and said inductive means whereby the latter is moved angularly to a position wherein the voltage induced in said inductive means is varied to operate said motor at a speed proportional to the rate of craft turn.

11. An integrating device for an aircraft comprising an induction motor, resiliently constrained inductive means mounted for angular movement by said motor, means comprising a rate of turn gyro mounted for precession in accordance with the rate of craft turn and connected electrically with said inductive means to induce voltages therein as a function of the rate of craft turn, an electrical connection between said inductive means and said motor for energizing and operating said motor, and means comprising an eddy current drag coupling between said motor and said inductive means whereby the latter is moved angularly against said resilient constraint to a position wherein the voltage induced in said inductive means is varied to operate said motor at a speed proportional to the rate of craft turn.

12. An integrating device for an aircraft comprising an induction motor having a driving shaft, resiliently constrained inductive means, a driven shaft coaxial with said driving shaft mounting said inductive means for angular movement by said driving shaft, means comprising a rate of turn gyro mounted for precession in accordance with the rate of craft turn and connected electrically with said inductive means to induce voltages therein as a function of the rate of craft turn, an electrical connection between said inductive means and said motor for energizing said motor thus operating said driving shaft, and means comprising a drag cup carried by said driven shaft and magnetic means associated with the driving shaft whereby the inductive means is moved angularly against said resilient constraint to a position wherein the voltage induced in said inductive means is varied to operate said motor and said driving shaft at a speed proportional to the rate of craft turn.

13. An integrating device for an aircraft comprising an induction motor having a driving shaft, means comprising a stator and a rotor in inductive relation with said stator, said rotor being mounted coaxially with said driving shaft for angular movement thereby, means comprising a rate of turn gyro mounted for precession in accordance with the rate of craft turn and connected electrically with said stator whereby voltages are induced in said rotor as a function of the rate of craft turn, an electrical connection between said rotor and said motor for energizing said motor thus operating said driving shaft, means comprising a drag cup drivably associated with said rotor, and magnetic means associated with said driving shaft whereby said rotor is moved angularly to a position wherein the voltage induced in said rotor is varied to operate said motor and said driving shaft at a speed proportional to the rate of craft turn.

14. An integrating device for an aircraft comprising an induction motor, inductive means arranged for angular movement by said motor, means comprising a rate of turn gyro mounted for precession in accordance with the rate of craft turn and connected electrically with said inductive means to induce voltages therein as a function of the rate of craft turn, an electrical connection between said rotor and said motor, for energizing and operating said motor, means having a portion thereof driven by said motor and being provided with a rocking cage, a resiliently constrained shaft movable with said cage, rotatable means connected with a second portion of said last-named means and driven thereby, means yieldably opposing rotation of said rotatable means whereby said cage shaft is moved angularly against said resilient constraint, and means interconnecting said cage shaft and said inductive means whereby the latter is moved angularly to a position wherein the voltage induced in said inductive means is varied to operate said motor at a speed proportional to the rate of craft turn.

15. An integrating device for an aircraft comprising an induction motor, inductive means arranged for angular movement by said motor, means comprising a rate of turn gyro mounted for precession in accordance with the rate of craft turn and connected electrically with said inductive means to induce voltages therein as a function of the rate of craft turn, an electrical connection between said rotor and said motor for energizing and operating said motor, means having an input shaft driven by said motor and an output shaft, a rocking cage associated with said input and output shafts, a resiliently constrained shaft movable with said cage, a drag cup carried by said output shaft, a stationary magnet associated with said drag cup yieldably opposing motion of said output shaft whereby said cage is rocked and said cage shaft is moved angularly against said resilient constraint, and means interconnecting said cage shaft and said inductive means whereby the latter is moved angularly to a position wherein the voltage induced in said inductive means is varied to operate said motor at a speed proportional to the rate of craft turn.

16. An integrating device for an aircraft comprising an induction motor, means comprising a stator and a rotor in inductive relation with said stator, said rotor being mounted for angular movement in response to the operation of said motor, means comprising a rate of turn gyro mounted for precession in accordance with the rate of craft turn and connected electrically with said stator whereby voltages are induced in said rotor as a function of the rate of craft turn, an electrical connection between said rotor and said motor for energizing and operating said motor, means having a shaft driven by said motor and a driving shaft, a rocking cage associated with said driven and driving shafts, a resiliently constrained shaft movable with said cage, a drag cup carried by said driving shaft, a stationary magnet associated with said drag cup yieldably opposing rotation of said driving shaft whereby said cage is rocked and said cage shaft is moved angularly against said resilient constraint, and means interconnecting said cage shaft and said rotor whereby the latter is moved angularly to a position wherein the voltage induced in said rotor is varied to operate said motor at a speed proportional to the rate of craft turn.

17. In apparatus of the class described, indicating means, means for driving said indicating means, gyroscopic means mounted for precession in accordance with the rate of turn of a craft, means associated with said gyroscopic means comprising a transmitter stator and a rotor inductively associated with said stator, means governing the speed of said driving means comprising a receiver stator electrically connected with said transmitter stator, a rotor inductively associated with said receiver stator and mounted for angular movement in response to the operation of said driving means, an electrical connection between said receiver rotor and said driving means, and a yieldable coupling connecting said driving means and said receiver rotor whereby during a turn of said craft said transmitter rotor is moved angularly in accordance with said precession thereby inducing a voltage in said receiver rotor as a function of the rate of craft turn for operating said driving means whereby said receiver rotor is moved angularly through said coupling to a position substantially in agreement with said transmitter rotor at which position the voltage induced in the receiver rotor is varied to operate said driving means at a speed proportional to the rate of craft turn.

18. In apparatus of the class described, indicating means, an induction motor for driving said indicating means, gyroscopic means mounted for precession in accordance with the rate of turn of a craft, means associated with said gyroscopic means comprising a transmitter stator and a rotor inductively associated with said stator, means governing the speed of said motor in accordance with the rate of craft turn comprising a receiver stator electrically connected with said transmitter stator, a rotor inductively associated with said receiver stator and mounted for angular movement in response to the operation of said motor, an electrical connection between said receiver rotor and said motor and an eddy current drag clutch connecting said induction motor and said receiver rotor whereby during a turn of said craft said transmitter rotor is moved angularly in accordance with said precession thereby inducing a voltage in said receiver rotor as a function of the rate of craft turn for operating said induction motor whereby said receiver rotor is moved angularly through said clutch to a position substantially in agreement with said transmitter rotor at which position the voltage induced in the receiver rotor is varied to operate said driving means at a speed proportional to the rate of craft turn.

19. In apparatus of the class described, indicating means, means for driving said indicating means, gyroscopic means mounted for precession in accordance with the rate of turn of a craft, means associated with said gyroscopic means comprising a transmitter stator and a rotor inductively associated with said stator, means governing the speed of said driving means in accordance with the rate of craft turn comprising a receiver stator electrically connected with said transmitter stator, a rotor inductively associated with said receiver stator and mounted for angular movement in response to the operation of said driving means, an electrical connection between said receiver rotor and said driving means, means yieldingly opposing rotation of said receiver rotor, a yielding coupling connecting said driving means and said receiver rotor whereby during a turn of said craft said transmitter rotor is moved angularly in accordance with said precession thereby inducing a voltage in said receiver rotor as a function of the rate of craft turn for operating said driving means whereby said receiver rotor is moved angularly against the action of said yieldably opposing means through said coupling to a position substantially in agreement with said transmitter rotor at which position the voltage induced in the receiver rotor is varied to operate said driving means at a speed proportional to the rate of craft turn, and means responsive to the direction of the earth's magnetic field for assuming primary energization of said driving means when the craft turn has terminated whereby said indicating means is driven to a positional agreement with said last-named responsive means.

20. In apparatus of the class described, indicating means, means for driving said indicating means, gyroscopic means mounted for precession in accordance with the rate of turn of a craft, means associated with said gyroscopic means comprising a transmitter stator and a rotor inductively associated with said stator, means governing the speed of said driving means in accordance with the rate of craft turn comprising a receiver stator electrically connected with said transmitter stator, a rotor inductively associated with said receiver stator and mounted for angular movement in response to the operation of said driving means, an electrical connection between said receiver rotor and said driving means, means yieldingly opposing rotation of said receiver rotor, a yielding coupling connecting said driving means and said receiver rotor whereby during a turn of said craft said transmitter rotor is moved angularly in accordance with said precession thereby inducing a voltage in said receiver rotor as a function of the rate of craft turn for operating said driving means whereby said receiver rotor is moved angularly against the action of said yieldably opposing means through said coupling to a position substantially in agreement with said transmitter rotor at which position the voltage induced in the receiver rotor is varied to operate said driving means at a speed proportional to the rate of craft turn, and means responsive to the direction of the earth's magnetic field for assuming primary energization of said driving means when the craft turn has terminated whereby said indicating means is driven to a positional agreement with said last-named responsive means, said receiver rotor being moved an angular amount against the action of said yieldingly opposing means through said coupling to have a voltage induced therein to dampen the control of said responsive means upon said indicating means.

21. In combination, means responsive to the rate of turn of a craft, means controlled by said rate of turn responsive means for integrating said rate of turn to obtain the amount of turn of the craft, means responsive to the earth's magnetic field connected with and controlling said integrating means for correcting the integrated amount of turn for an erroneous integrated change of heading, and means actuated by said integrating means in accordance with the corrected amount of turn.

22. In combination, means responsive to the rate of turn of a craft, means controlled by said rate of turn responsive means for integrating said rate of turn to obtain the amount of turn of the craft, means responsive to the earth's magnetic field electrically connected with and controlling said integrating means for correcting the integrated amount of turn for an erroneous integrated change of heading, and indicating means actuated by said integrating means in accordance with the corrected amount of turn.

23. In combination, controlling means comprising a first inductive device having a stator winding and a rotor winding in inductive relation with each other, one of said windings being polyphase and the other single phase, a two-phase alternating current driving motor connected to actuate the rotor winding of said inductive device and having a winding in each phase, a source of periodically varying current connected to energize the winding of the first phase of said driving motor, means responsive to the rate of turn of a craft upon which the controlling means are mounted, means energized by said source of periodically varying current and controlled by said rate of turn responsive means and connected to energize one of the windings of said first inductive device, means connecting the other winding of said first inductive device to energize the winding of the second phase of said driving motor, whereby the latter rotates to actuate the rotor winding of said first inductive device upon operation of said rate of turn responsive means, a second inductive device having a stator winding and a rotor winding in inductive relation with each other, one of said windings being polyphase and the other being single phase, the rotor winding of said second inductive device also being drivably connected to said driving motor for actuation thereby, means responsive to the direction of the earth's magnetic field for generating another periodically varying current and connected to energize one of the windings of said second inductive device, and means connecting the other winding of said second inductive device to additionally energize the winding of the second phase of said driving motor, whereby the latter rotates to actuate the rotor winding of said second inductive device upon operation of said direction responsive means.

24. Apparatus comprising, in combination, gyroscopic means responsive to the rate of turn of a craft upon which the apparatus is carried, electrical means controlled by said gyroscopic means for integrating said rate of turn to obtain the amount of turn of said craft, a magnetic compass, means comprising an electrical circuit connected with and controlled by said magnetic compass for controlling said electrical means to correct the integrated amount of turn for an erroneous integrated change of heading, and means actuated by said integrating means in accordance with the corrected amount of turn.

25. Apparatus comprising, in combination, gyroscopic means responsive to the rate of turn of a craft upon which the apparatus is carried, electrical means controlled by said gyroscopic means for integrating said rate of turn to obtain the amount of turn of said craft, a magnetic compass, means comprising an electrical circuit connected with said electrical means and controlled by said magnetic compass for controlling said electrical means to correct the integrated amount of turn for an erroneous integrated change of heading, and indicating means actuated by said integrating means in accordance with the corrected amount of turn.

PAUL A. NOXON.